(12) United States Patent
Oguri (10) Patent No.: US 9,701,014 B2
(45) Date of Patent: Jul. 11, 2017

(54) ROBOT CONTROL DEVICE FOR PREVENTING MISJUDGMENT BY COLLISION JUDGING PART

(71) Applicant: FANUC Corporation, Yamanashi (JP)

(72) Inventor: Kenichirou Oguri, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/794,338

(22) Filed: Jul. 8, 2015

(65) Prior Publication Data

US 2016/0008978 A1 Jan. 14, 2016

(30) Foreign Application Priority Data

Jul. 9, 2014 (JP) .................................. 2014-141716

(51) Int. Cl.
*B25J 9/16* (2006.01)
(52) U.S. Cl.
CPC ... *B25J 9/1612* (2013.01); *G05B 2219/39505* (2013.01); *Y10S 901/02* (2013.01)
(58) Field of Classification Search
CPC .................. B25J 9/1612; B25J 9/1633; G05B 2219/39505; Y10S 901/02
See application file for complete search history.

(56) References Cited

U.S. PATENT DOCUMENTS

2011/0270444 A1 11/2011 Nagata et al.

FOREIGN PATENT DOCUMENTS

| CN | 1771114 | A |   | 5/2006 |
|----|---------|---|---|--------|
| CN | 102426391 | A |   | 4/2012 |
| CN | 102615551 | A |   | 8/2012 |
| DE | 102011003374 | A1 |   | 8/2012 |
| JP | 04242406 | A | * | 8/1992 |
| JP | H04-242406 | A |   | 8/1992 |
| JP | H11-291190 | A |   | 10/1999 |
| JP | 11-320477 | A |   | 11/1999 |
| JP | 11320477 | A | * | 11/1999 |
| JP | 2001-353687 | A |   | 12/2001 |
| JP | 2001353687 | A | * | 12/2001 |
| JP | 2006-123012 | A |   | 5/2006 |
| JP | 2006123012 | A | * | 5/2006 |
| JP | 2008-183680 | A |   | 8/2008 |
| JP | 2008183680 | A | * | 8/2008 |
| JP | 2010-69585 | A |   | 4/2010 |
| JP | 2010069585 | A | * | 4/2010 |

(Continued)

*Primary Examiner* — John Breene
*Assistant Examiner* — Yaritza H Perez Bermudez
(74) *Attorney, Agent, or Firm* — Hauptman Ham, LLP (57) ABSTRACT

A robot control device is configured to recognize a state transition between a state where a load of a workpiece is not transmitted to a robot and a state where the entire load of the workpiece is transmitted through a hand to the robot, and define a region which encompasses the robot and hand at the start time of the state transition, within a status space which expresses the status of the robot and hand. The collision judging part of the robot control device compares a disturbance estimated value and a first threshold value when the robot and hand are located inside the defined region, and compares the disturbance value and a second threshold value which is different from the first threshold value when the robot and hand are located outside the defined region.

5 Claims, 10 Drawing Sheets

(56) References Cited

FOREIGN PATENT DOCUMENTS

| JP | 2012-232384 A | 11/2012 |
| JP | 2013-43232 A | 3/2013 |
| JP | 2013-169609 A | 9/2013 |

* cited by examiner

ROBOT CONTROL DEVICE FOR PREVENTING MISJUDGMENT BY COLLISION JUDGING PART

RELATED APPLICATIONS

The present application claims priority to Japanese Application Number 2014-141716, filed Jul. 9, 2014, the disclosure of which is hereby incorporated by reference herein in its entirety.

BACKGROUND OF THE INVENTION

1. Field of the Invention

The present invention relates to a robot control device which can prevent misjudgment in judging if a robot has collided with an obstacle.

2. Description of the Related Art

Some conventional robot control devices are provided with a collision judging part for judging if a moving part of a robot has collided with an obstacle. A collision judging part of a conventional robot control device estimates a disturbance torque which is applied to a moving part of a robot based on a rotational speed and drive torque, etc., of a servo motor, and compares the estimated value of the disturbance torque with a predetermined threshold value to judge if there is any collision of the moving part. In relation to this, the method of collision detection in JP-A-H04-242406 calculates the disturbance torque due to contact and collision with an obstacle by subtracting a frictional torque and torque due to the effect of gravity from the disturbance torque which is estimated by an observer.

In this regard, it is known that the drive torque of a servo motor changes by an amount of the weight of a workpiece in accordance with whether the robot is gripping a workpiece. Therefore, in order to accurately estimate a disturbance torque, it is necessary to switch a numerical value of a parameter relating to the weight of the workpiece among the various parameters which are used for estimate calculation, in accordance with whether the robot is gripping a workpiece. Furthermore, it should be noted that even if the robot grips a workpiece, the load of the workpiece may not be completely transmitted to the robot. This point will be explained with reference to the example of a robot for lifting up a workpiece placed on a table. In this case, even when the robot grips a workpiece, the load of the workpiece will not be transmitted to the robot at all or only part of the load of the workpiece will be transmitted through a hand to the robot as long as the workpiece is receiving the reaction force from the table. After that, at the instant when the workpiece is lifted up by the robot and leaves the top surface of the table, the entire load of the workpiece will be transmitted through the hand to the robot.

Therefore, in the conventional method of collision judgment, it is difficult to accurately estimate the disturbance which is applied to the robot during the period from when the robot grips the workpiece to when the workpiece leaves the table. Similarly, in the case where the robot is placing a workpiece on a table, it is difficult to accurately estimate the disturbance which is applied to the robot during the period from when the workpiece contacts the table to when the robot releases the workpiece. As explained above, in the conventional method of collision detection, it is difficult to accurately estimate the disturbance which is applied to the robot during the period when a state transition is underway from either one to the other of the state where the load of the workpiece is not transmitted to the robot and the state where the entire load of the workpiece is transmitted to the robot. For this reason, the conventional method is liable to make misjudgment in judging if the robot has collided with an obstacle during the period when the above state transition is underway.

In relation to this, there is known a method of collision judgment which judges if there is any collision, using a separate threshold value which is set for each region in the work space of the robot. For example, JP-A-H11-291190 proposes a method of collision judgment which uses one threshold value for judging welding state by welding electrodes in the region where a welding robot performs a welding process, and uses another threshold value for judging a collision of an arm or end effecter in other regions. Further, JP-A-2013-169609 proposes a method of collision judgment which uses a larger threshold value for collision judgment when an expected value of motor torque which is evaluated from a position, speed, acceleration, etc., of a servo motor exceeds a predetermined value, and JP-A-2001-353687 proposes a method of collision judgment which uses a threshold value for collision judgment, which is variable in accordance with an operating speed of the robot. However, even if these methods of collision judgment are used, it is not possible to prevent misjudgment during the period when the state transition is underway.

A robot control device is being sought which can prevent misjudgment in judging whether a robot has collided with an object even during the period when a state transition is underway from either one to the other of the state where the load of the workpiece is not transmitted to the robot and the state where the entire load of the workpiece is transmitted to the robot to the other.

SUMMARY OF INVENTION

According to a first aspect of the present invention, there is provided a robot control device for controlling a robot which is provided with a hand which can grip a workpiece, comprising a disturbance estimating part which evaluates an estimated value of a disturbance which is applied to the robot, a transition recognizing part which recognizes the occurrence of state transition between a state where a load of the workpiece is not transmitted to the robot and a state where the entire load of the workpiece is transmitted through the hand to the robot, a region defining part which defines a region which encompasses a robot and hand at the start time of the state transition which is recognized by the transition recognizing part, in a state space which expresses the state of the robot and hand, a position judging part which judges if the robot and hand are located inside the region which is defined by the region defining part, and a collision judging part which compares the estimated value and a predetermined threshold value to judge if the robot has collided with an obstacle, wherein the collision judging part compares the estimated value and a first threshold value when the robot and hand are located inside the region and compares the estimated value and a second threshold value which is different from the first threshold value when the robot and hand are located outside the region.

According to a second aspect of the present invention, there is provided a robot control device of the first aspect, wherein the disturbance estimating part uses at least one of a rotational speed and torque of a servo motor which drives the robot to evaluate the estimated value.

According to a third aspect of the present invention, there is provided a robot control device of the first or second aspect, wherein the disturbance estimating part uses a parameter value which expresses a mass of a workpiece which is acquired from an operating program of the robot to evaluate the estimated value.

According to a fourth aspect of the present invention, there is provided a robot control device of any one of the first to third aspects, wherein the collision judging part compares the estimated value and the second threshold value regardless of the judgment result of the position judging part once the robot and hand have moved from the inside to the outside of the region.

According to a fifth aspect of the present invention, there is provided a robot control device of any one of the first to fourth aspects, wherein the shape of the region is determined considering the direction in which the hand moves after gripping the workpiece.

These and other objects, features, and advantages of the present invention will become clearer with reference to the detailed description of an illustrative embodiment of the present invention which is shown in the attached drawings.

DETAILED DESCRIPTION OF EMBODIMENTS

Below, an embodiment of the present invention will be explained in detail with reference to the drawings. In the drawings, similar component elements are assigned similar notations. Note that the following explanation does not limit the technical scope of the inventions which are described in the claims or the meaning of terms etc.

Figure 1:
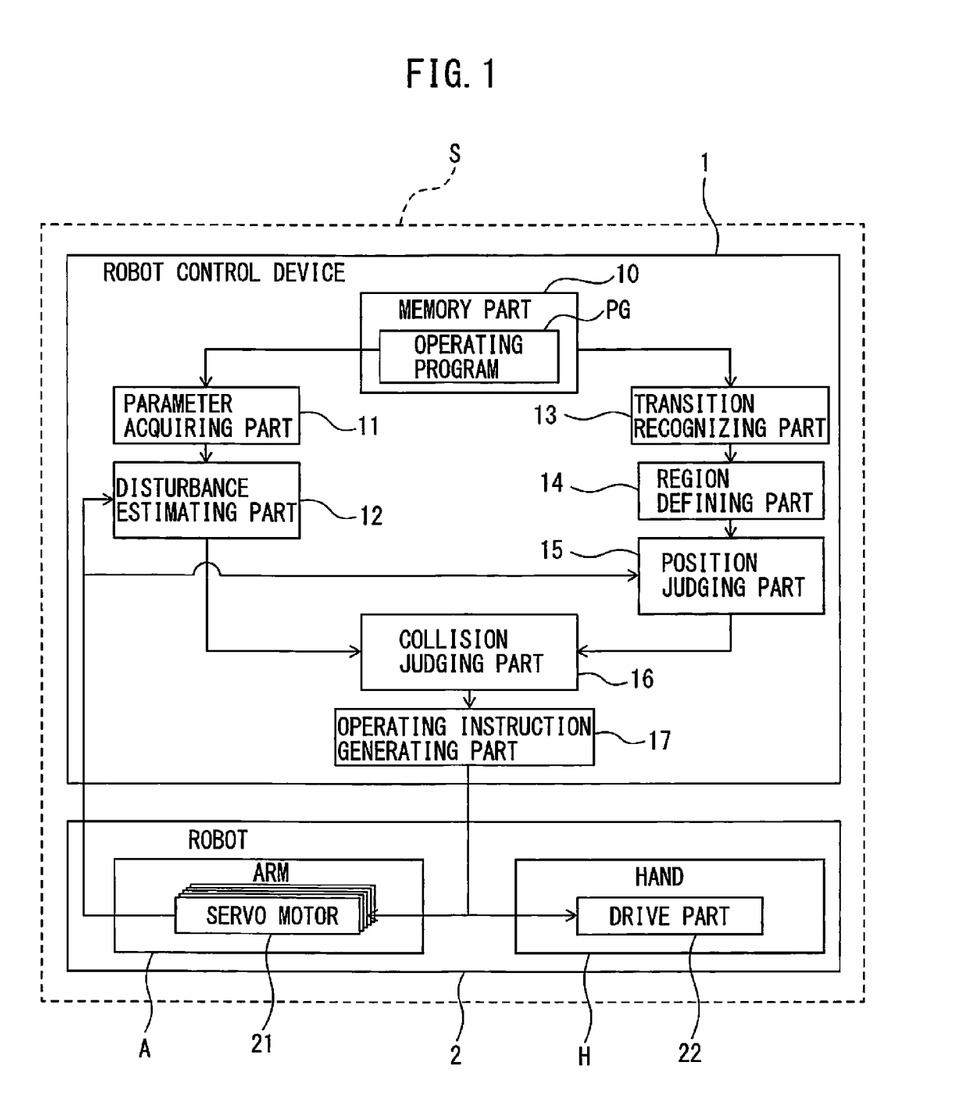
FIG. 1 is a block diagram which shows the configuration of a robot system which includes a robot control device according to one embodiment of the present invention.

Referring to FIG. 1 to FIG. 15, a robot control device of one embodiment of the present invention will be explained. FIG. 1 is a block diagram which shows the configuration of a robot system S which includes an illustrative robot control device 1 of the present embodiment. The robot system S of the present example is an automation system which conveys various workpieces by operating a robot. The process by which the robot system S of the present example conveys a workpiece will sometimes be referred to below as a "workpiece conveyance process". As shown in FIG. 1, the robot system S of the present example includes a robot R which comprises an arm A and a hand H. The robot control device 1 of the present example has the function of controlling the operations of various parts of the robot 2. Furthermore, the robot control device 1 of the present example has a disturbance estimation function for calculating an estimate value of the disturbance which is applied to a moving part of the robot R, a collision judgment function for judging if a moving part of the robot R has collided with an obstacle, etc.

Figure 2:
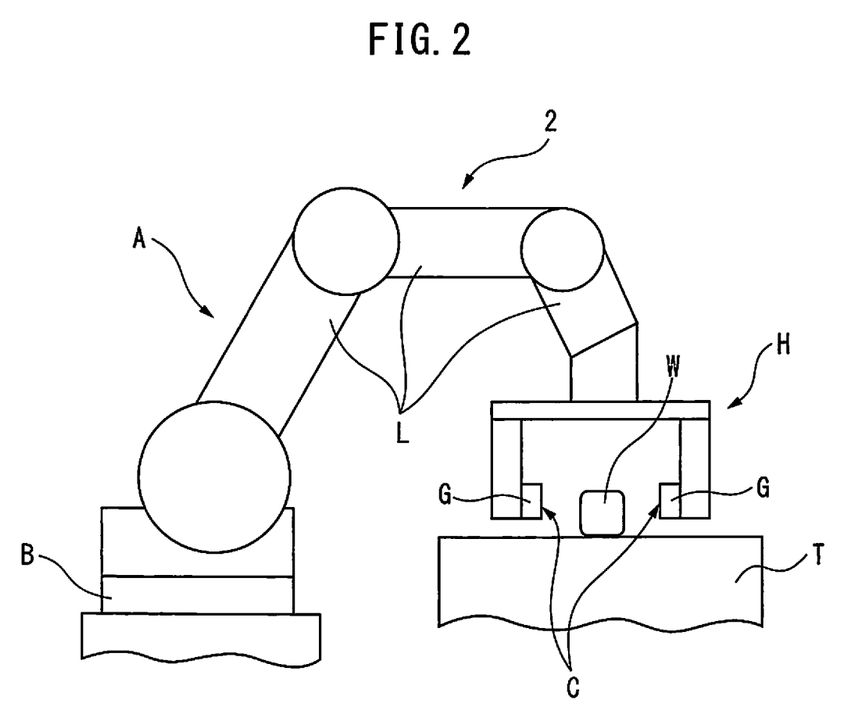
FIG. 2 is a side view which shows the appearance of a robot in FIG. 1.

FIG. 2 is a side view which shows the appearance of the robot 2 in FIG. 1. As shown in FIG. 2, the robot 2 of the present example is a vertical articulated robot which comprises an arm A which is formed by a plurality of serially-connected links L, and a hand H which is attached to the front end part of the arm A. The number of axes of the robot 2 is not limited to only the illustrated example. As shown in FIG. 2, the hand H of the present example comprises a pair of grippers G, G which can grip a workpiece W to be conveyed. Below, a predetermined part of each gripper G which includes a contact surface with the workpiece W will sometimes be referred to as a "contact part C" of each gripper G. However, only the contact surface of each gripper G with the workpiece W may be referred to as the "contact part C" of each gripper G. Further, the robot 2 of the present example operates in accordance with a prepared operating program PG so as to convey a workpiece W which is gripped by the hand H from a first position to a second position in a predetermined work space. Here, the first position in the work space of the robot 2 is for example a top surface of a table T which is mounted in the work space, while the second position is for example a top surface of another table which is mounted in the work space.

Referring again to FIG. 1, the arm A of the robot 2 of the present example is provided with a number of servo motors 21 corresponding to the number of axes. Each servo motor 21 has a built-in sensor such as a rotary encoder (not shown). The sensor of each servo motor 21 generates feedback information of each servo motor 21 including a rotational direction, rotational angle, and rotational speed, and transmits it to the disturbance estimating part 12 of the robot control device 1. Further, the hand H of the present example is provided with a drive part 22 which drives the pair of grippers G, G so that the pair of grippers G, G move in a direction toward each other and a direction away from each other. The drive part 22 of the present example uses fluid pressure such as hydraulic or pneumatic pressure to drive the pair of grippers G, G.

Next, referring to FIG. 1, the robot control device 1 of the present example comprises a memory part 10, parameter acquiring part 11, disturbance estimating part 12, transition recognizing part 13, region defining part 14, position judging part 15, collision judging part 16, operating instruction generating part 17, etc. These parts of the robot control device 1 will be explained in detail below. The memory part 10 of the present example is a memory device which includes a ROM (Read Only Memory) and RAM (Random Access Memory) etc. The memory part 10 of the present example stores an operating program PG of the robot which was prepared in advance and also the later explained first threshold value $v_1$ and second threshold value $v_2$ etc.

Next, the parameter acquiring part 11 of the present example has the function of acquiring a numerical value of a parameter relating to the workpiece W in various parameters which are used for estimate calculation of the disturbance which is applied to a moving part of the robot 2. The above parameter relating to the workpiece W will sometimes be referred to below as the "workpiece parameter". The workpiece parameter includes at least the weight of the workpiece W. If necessary, the workpiece parameter may also include the center of mass of the workpiece W and inertia matrix etc. As shown in FIG. 1, the numerical value which is acquired by the parameter acquiring part 11 is transmitted to the disturbance estimating part 12. Note that the numerical value of the workpiece parameter may also be input through various input devices from the user instead of being acquired from the operating program PG. In this case, the numerical value of the workpiece parameter may be input in the form of various signals. For example, the state where the hand H does not grip a workpiece W may be input in the form of mass 0, center of mass 0, and inertia matrix 0.

Next, the disturbance estimating part 12 of the present example has the function of calculating the estimated value of distribution which is applied to the robot based on the numerical value of the workpiece parameter which is acquired by the parameter acquiring part 11, feedback information which is acquired from the built-in sensor of the servo motor 21 or other detector, the numerical value of a dynamic parameter of the link L of the robot 2, etc. The above feedback information includes at least one of the rotational speed and drive torque of the servo motor 21. However, the above feedback information may be any information that is useful for estimate calculation of disturbance. The above dynamic parameter may also include, for example, the positional relationship of the links of robot 2, mass, center of mass, inertia matrix, etc. As shown in FIG. 1, the estimated value of the disturbance which is calculated by the disturbance estimating part 12 is transmitted to the collision judging part 16.

Next, the transition recognizing part 13 of the present example has the function of recognizing the fact that a state transition is underway from either one to the other of the state where the load of the workpiece W is not transmitted to the robot 2, and the state where the entire load of the workpiece W is transmitted through the hand H to the robot. One example of the former state is the state where the hand H of the robot 2 grips a workpiece W which is placed on the top surface of the table T, but there is no force acting upward from the hand H to the workpiece W in the vertical direction (for example, see FIG. 7). Further, one example of the latter state is the state where the hand H of the robot 2 grips the workpiece W and the workpiece W is spaced upward from the top surface of the table T in the vertical direction (for example, see FIG. 8).

The transition recognizing part 13 of the present example analyzes the operating program PG to recognize the fact that the above state transition has occurred, and then generates data to show the start time and position of the above state transition. As shown in FIG. 1, the data generated by the transition recognizing part 13 is transmitted to the region defining part 14. Note that, the transition recognizing part 13 may also analyze a signal which is input by the user through various input devices so as to recognize the occurrence of the above state transition instead of analyzing the operating program PG. Furthermore, the transition recognizing part 13 may also analyze the numerical value of the workpiece parameter which is input to the disturbance estimating part 12 so as to recognize the occurrence of the above state transition.

Next, the region defining part 14 of the present example has the function of defining the later explained threshold value switching region R, in a space which expresses a state of the robot 2 and hand H. The above space will sometimes be referred to below as the status space. The status space of the present example is typically a coordinate space which shows the 3D position of the hand H. However, the status space of the present example may also include, in addition to the dimensions of a 3D space or instead of the dimensions of a 3D space, the dimension of time or the dimensions of the rotational angles about the various axes of the robot 2, the dimension of the movable position of a gripper G of the hand H, and dimensions of all other variables which can define a state of the robot 2 and hand H. Further, the threshold value switching region R of the present example is a partial region of the status space of the robot 2 and hand H, which encompasses the robot 2 and hand H at the point of time when the above state transition is started. The threshold value switching region R of the present example typically is a 3D space which encompasses the 3D space occupied by the contact parts C of the grippers G of the hand H at the time when the above state transition is started. A typical example of such a threshold value switching region R is shown in FIG. 6 to FIG. 10, etc. In order to facilitate comparison of the position of the threshold value switching region R and the current position of the hand H, the region defining part 14 preferably employs as status of the hand H, the position of an arbitrary point of the hand H which is expressed by an orthogonal 3D coordinate system which is fixed with respect to the base B of the robot 2 so as to define the threshold value switching region R. However, the region defining part 14 may employ position expressed by each axis angle of robot 2 as status of the hand H. Furthermore, when the robot 2 performs line tracking, that is, when the robot 2 operates to track a workpiece W which moves on a conveyor, the region defining part 14 may employ the position of an arbitrary of the hand H which is expressed by an orthogonal 3D coordinate system which is fixed with respect to the workpiece W and movable with respect to the robot 2. Furthermore, the region defining part 14 may also define a threshold value switching region in the status space which includes the dimension of time in addition to the dimensions of space. In this case, for example, the region defining part 14 may define a threshold value switching region R which disappears after the elapse of a predetermined time, for example.

Figure 6:
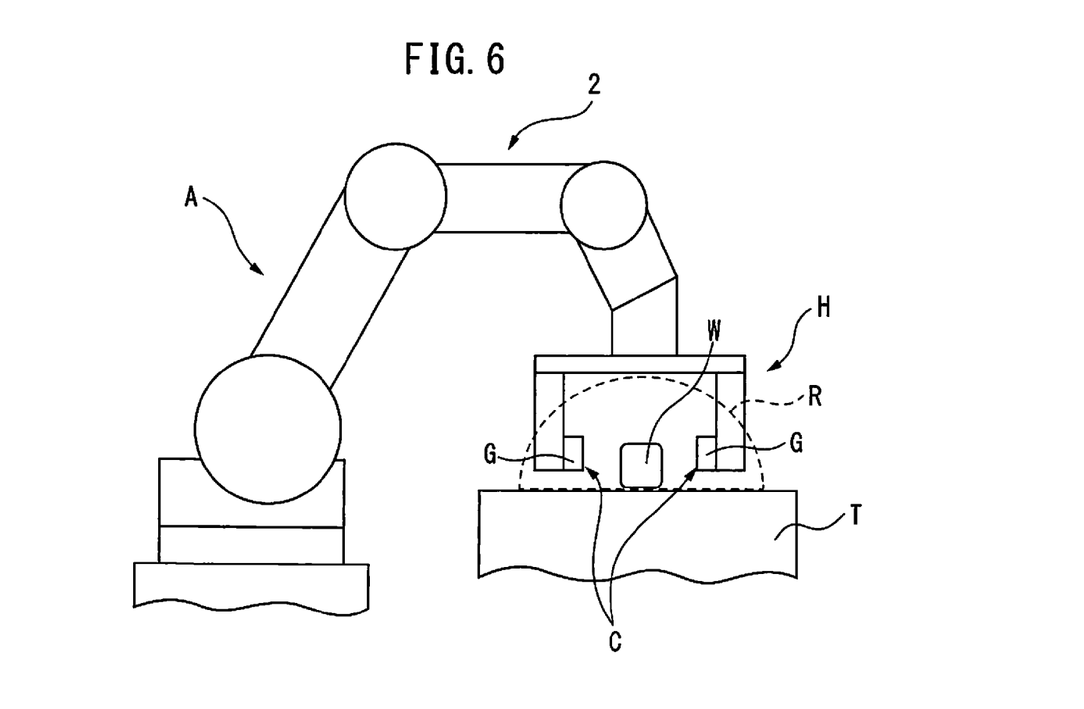
FIG. 6 is a side view which shows the state of the robot and workpiece at the point of time when step S304 in FIG. 3 is completed.

As explained later in relation to the position judging part 15 and the collision judging part 16, in the present example, the threshold value which is used for judgment of collision of the robot 2 is switched in accordance with whether the contact parts C, C of the grippers G, G of the hand H are positioned inside of the threshold value switching region R. The shape of the threshold value switching region R is not limited to only the example which is shown in FIG. 6 to FIG.

10 etc. However, in order to enable easier judgment of the later explained position judging part 15, the threshold value switching region R preferably has a streamlined semispherical or box shape. Data relating to the shape of the threshold value switching region R can be stored in advance in the memory part 10 etc. However, instead of defining a predetermined shape of threshold value switching region R in the status space of the robot 2 and hand H, the region defining part 14 may also define a shape of the threshold value switching region R considering the movement path of the hand H after gripping the workpiece W (see FIG. 14 and FIG. 15). In this case, the region defining part 14 analyzes the operating program PG to specify the movement path of the hand H. Furthermore, the region defining part 14 may also define a shape of the threshold value switching region R according to the user's designation through a user interface. As shown in FIG. 1, the data relating to the threshold value switching region R which is defined by the region defining part 14 is transmitted to the position judging part 15.

Next, the position judging part 15 of the present example has the function of judging if the robot 2 and hand H are currently positioned inside the threshold value switching region R in the above status space. More specifically, the position judging part 15 of the present example can judge if the contact parts C, C of the grippers G, G of the hand H are located inside the threshold value switching region R at the present time. In so doing, the position judging part 15 can use any orthogonal 3D coordinate system which is fixed to the base B of the robot 2 to compare the positions of the points of the hand H and the positions of the points of the threshold value switching region R. Further, the position judging part 15 judges if the contact parts C, C of the grippers G, G are positioned inside the threshold value switching region R based on the results of comparison between these positions. In so doing, the position judging part 15 can refer to information relating to the rotational angle which is acquired from a sensor of the servo motor 21 so as to specify the current position of the hand H. However, the position judging part 15 may also acquire other information which shows the current position of the hand H from a sensor of the servo motor 21 or another detector. Note that, the method of judgment employed by the position judging part 15 is not limited to the above method, and an optimal method of judgment may be selected in accordance with the shape, layout, etc., of the threshold value switching region R. As shown in FIG. 1, the results of judgment by the position judging part 15 are transmitted to the collision judging part 16.

Next, the collision judging part 16 of the present example has the function of comparing the estimated value of the disturbance which is calculated by the disturbance estimating part 12 and a predetermined threshold value so as to judge if the robot 2 has collided with some sort of obstacle. In so doing, the collision judging part 16 of the present example judges if there is any collision by comparing the estimated value of the disturbance and the first threshold value when the robot 2 and hand H are currently located inside the threshold value switching region R in the above status space. On the other hand, the collision judging part 16 of the present example judges if there is any collision by comparing the estimated value of the disturbance and the second threshold value which is different from the first threshold value when the robot 2 and hand H are not currently located inside the threshold value switching region R in the above status space. More specifically, the collision judging part 16 of the present example compares the estimated value of the disturbance and the first threshold value $v_1$ to judge if there is any collision when the contact parts C, C of the two grippers G, G of the hand H are located inside the threshold value switching region R (see FIG. 7 and FIG. 8). On the other hand, the collision judging part 16 compares the estimated value of the disturbance and the second threshold value $v_2$ which differs from the first threshold value $v_1$ to judge if there is any collision when the contact parts C, C of the two grippers G, G are not located inside the threshold value switching region R, that is, when the contact parts C, C of one or both of the grippers G, G are at least partially positioned outside the threshold value switching region R (see FIG. 9 and FIG. 10). The first threshold value $v_1$ and the second threshold value $v_2$ are stored in advance in the memory part 10 etc. These threshold values $v_1$, $v_2$ may be constant numerical values or may be numerical values which dynamically change in accordance with the postures and speeds of movement of various parts of the robot 2. As shown in FIG. 1, the result of judgment by the collision judging part 16 is transmitted to the operating instruction generating part 17.

Figure 4:
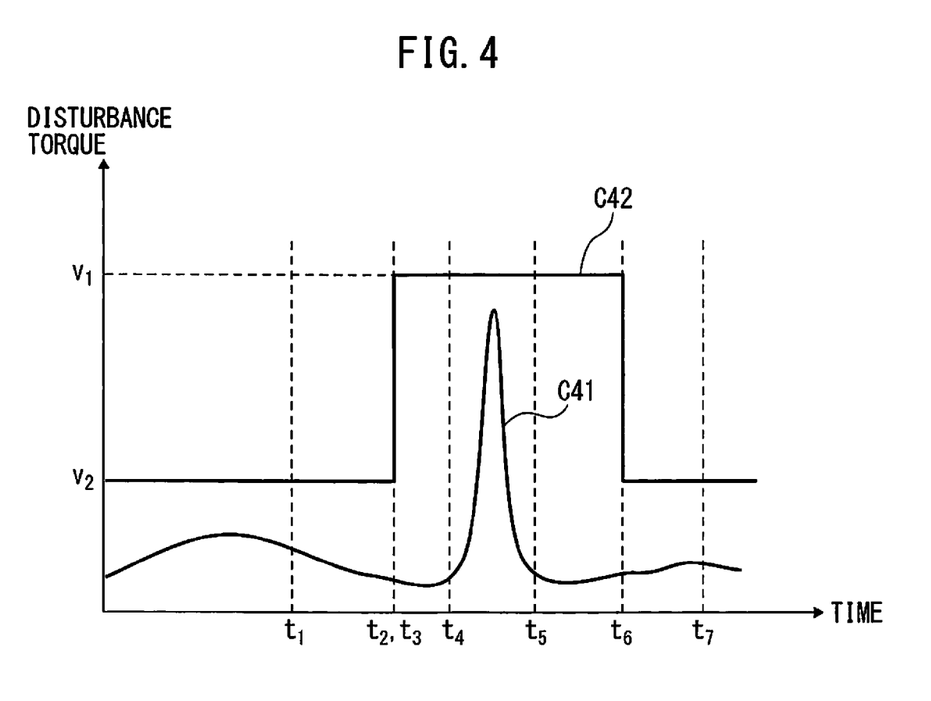
FIG. 4 is a graph which shows an example of the temporal change of an estimated value of a disturbance torque which is calculated by a disturbance estimating part in FIG. 1.

In this way, the collision judging part 16 of the present example switches the threshold value which is used for judgment of collision in accordance with whether the robot 2 and hand H are currently located inside the threshold value switching region R in the status space. Therefore, if suitable threshold values are experimentally found for collision judgment during the period when the above state transition is underway and for collision judgment during other periods, respectively, the former threshold value is stored as the first threshold value $v_1$ in the memory part 10, and the latter threshold value is stored as the second threshold value $v_2$ in the memory part 10, it is possible to prevent misjudgment as to if the robot 2 has collided with an obstacle during the period when the state transition is underway. The thus obtained first threshold value $v_1$ and second threshold value $v_2$ are illustrated in the graph of FIG. 4. However, the relative magnitude of the first threshold value $v_1$ and the second threshold value $v_2$ is not limited to only the example in the figure. In the above way, according to the robot control device 1 of the present embodiment, it is possible to prevent misjudgment by the collision judging part 16 during the period when the above state transition is underway.

Referring again to FIG. 1, the operating instruction generating part 17 of the present example has the function of generating an operating instruction of a robot 2 corresponding to the result of judgment of the collision judging part 16. More specifically, when receiving a result of judgment that the estimated value of disturbance is a threshold value or more, the operating instruction generating part 17 generates an operating instruction to stop the conveyance of the workpiece W, or an operating instruction to avoid an obstacle to convey the workpiece W. On the other hand, when receiving a result of judgment that the estimated value of disturbance is less than the threshold value, the operating instruction generating part 17 generates an operating instruction to continue conveyance of a workpiece W in accordance with the operating program PG. As shown in FIG. 1, the operating instruction which is generated by the operating instruction generating part 17 is transmitted to the servo motor 21 of the arm A and the drive part 22 of the hand H of the robot 2.

Figure 3:
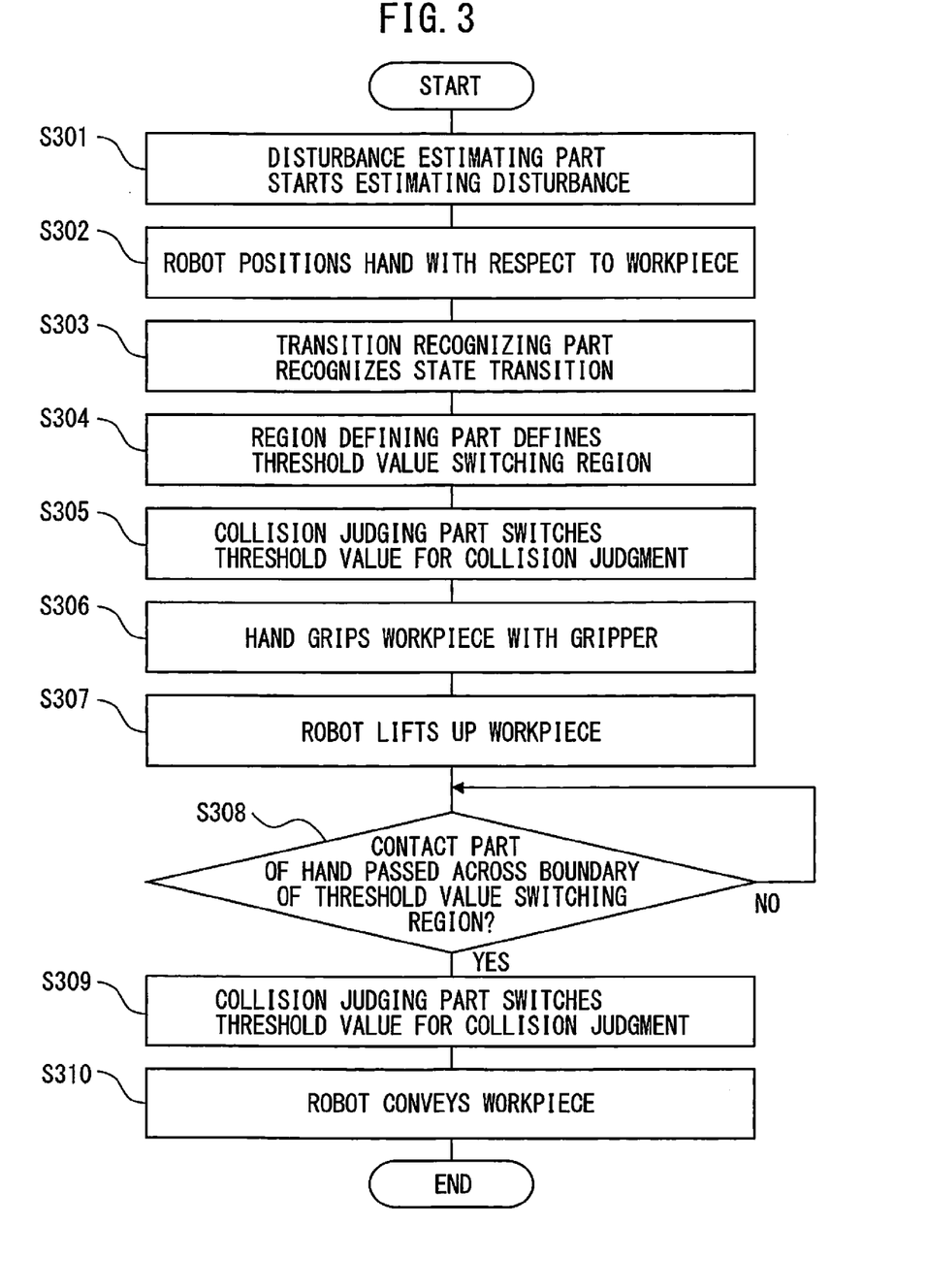
FIG. 3 is a flow chart which shows a routine of an illustrative workpiece conveyance process according to a robot system of FIG. 1.

Next, a workpiece conveyance process according to the robot system of FIG. 1 will be explained. FIG. 3 is a flow chart which should the routine of an illustrative workpiece conveyance process according to the robot system S of FIG. 1. As shown in FIG. 3, at step S301, the disturbance estimating part 12 of the robot control device 1 starts estimating the disturbance which is applied to the robot 2. More specifically, at step S301, the disturbance estimating part 12 starts the estimate calculation of the disturbance torque which is applied to the servo motor 21 of the robot 2. After this step, the disturbance estimating part 12 repeatedly performs the estimate calculation of the disturbance torque with a predetermined period. FIG. 4 is a graph which shows one example of the temporal change C41 of the estimated value ($T_d$) of the disturbance torque which is calculated by the disturbance estimating part 12. The graph of FIG. 4 shows the temporal change C42 of the threshold value which is used for collision judgment by the collision judging part 16.

The disturbance estimating part 12 of the present example may calculate the estimated value ($T_d$) of the disturbance torque by subtracting an acceleration torque ($T_a$) and a friction torque ($T_f$) from the drive torque ($T_0$) of the servo motor 21. That is, the disturbance estimating part 12 can use the following formula (1) to calculate the estimated value ($T_d$) of the disturbance torque.

$$T_d = T_0 - T_a - T_f \quad (1)$$

Here, the acceleration torque ($T_a$) is the torque which is attributed to the inertia of a moving part of the robot 2, while the friction torque ($T_f$) is the torque which is attributed to the frictional force acting on the moving part of the robot 2. The graph of FIG. 4 shows the absolute value of the estimated value ($T_d$) of the disturbance torque.

As will be understood from FIG. 4, the graph of the estimated value ($T_d$) of the disturbance torque is generally constant during the period before the time $t_4$ and the period from the time $t_5$ onward, but forms a sharp peak between the time $t_4$ and the time $t_5$. The reason why such a peak is formed will be explained below. First, the time $t_4$ in the graph of FIG. 4 expresses the point of time when the grippers G, G of the hand H grip the workpiece W on the table T. However, at this point of time, there is no force acting upward from the grippers G, G of the hand H on the workpiece W in the vertical direction. That is, at this point of time, the load of the workpiece W is not transmitted to the robot 2. Nonetheless, the disturbance estimating part 12 of the present example deems that the entire load of the workpiece W is transmitted through the hand H to the robot 2 in calculating the estimated value ($T_d$) of the disturbance torque, from the time $t_4$ onward. More specifically, the disturbance estimating part 12 of the present example uses the acceleration torque ($T_a$) which is obtained from the total mass of the robot 2 and the workpiece W to calculate the estimated value ($T_d$) of the disturbance torque, from the time $t_4$ onward (see above formula (1)). Therefore, the estimated value ($T_d$) of the disturbance torque greatly deviates from the disturbance torque which is actually applied to the servo motor 21 during the period from the time when the hand H grips the workpiece W, i.e., the time $t_4$ to when the workpiece W leaves the table T. As a result, the graph of the temporal change C41 of the estimated value ($T_d$) of the disturbance torque forms a sharp peak between the time $t_4$ and the time $t_5$.

Figure 5:
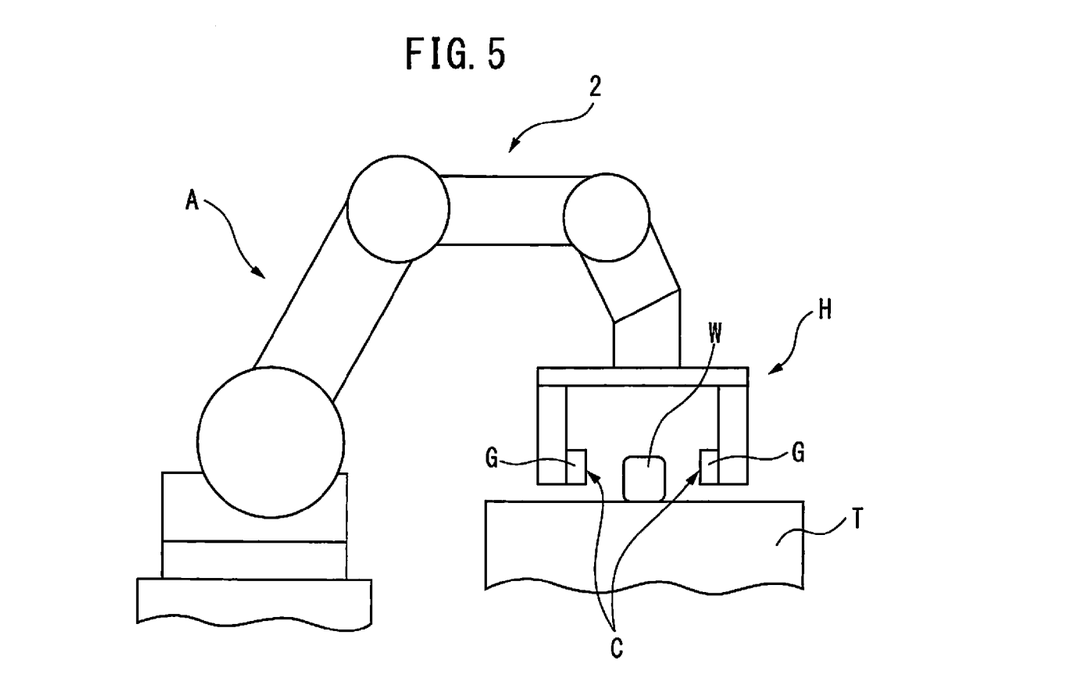
FIG. 5 is a side view which shows the state of the robot and workpiece at the point of time when step S302 in FIG. 3 is completed.

Again referring to FIG. 3, at step S302, the robot 2 positions the hand H with respect to the workpiece W which is placed on the table T. FIG. 5 is a side view which shows the state of the robot 2 and workpiece W at the point of time when step S302 is completed. As will be understood from FIG. 5, at step S302, the hand H is positioned with respect to the workpiece W so that the contact parts C, C of the pair of grippers G, G face the side surfaces of the workpiece W. The point of time when step S302 is completed corresponds to the time $t_1$ in the graph of FIG. 4. As will be understood from FIG. 4, during a certain period including the time $t_1$, a predetermined second threshold value $v_2$ is used for collision judgment by the collision judging part 16. Next, at step S303, the transition recognizing part 13 of the robot control device 1 recognizes the state transition from the state where the load of the workpiece W is not transmitted to the robot 2 to the state where the entire load of the workpiece W is transmitted through the hand H to the robot 2.

Next, at step S304, the region defining part 14 of the robot control device 1 defines a predetermined shape of threshold value switching region R in the work space of the robot 2. FIG. 6 is a side view which shows the robot 2 and workpiece W at the point of time when step S304 is completed. As will be understood from FIG. 6, the threshold value switching region R which is defined in step S304 has a semispherical form which is virtually placed on the table T so as to encompass the space which the workpiece W occupies on the table T. The point of time when step S304 is completed corresponds to the time $t_2$ in the graph of FIG. 4. Next, at step S305, the collision judging part 16 of the robot control device 1 switches the second threshold value $v_2$ which has been used for judgment of collision until then to the first threshold value $v_1$ which is larger than the second threshold value $v_2$. The point of time when step S305 is completed corresponds to the time $t_3$ which is substantially equal to the time $t_2$ in the graph of FIG. 4.

Figure 7:
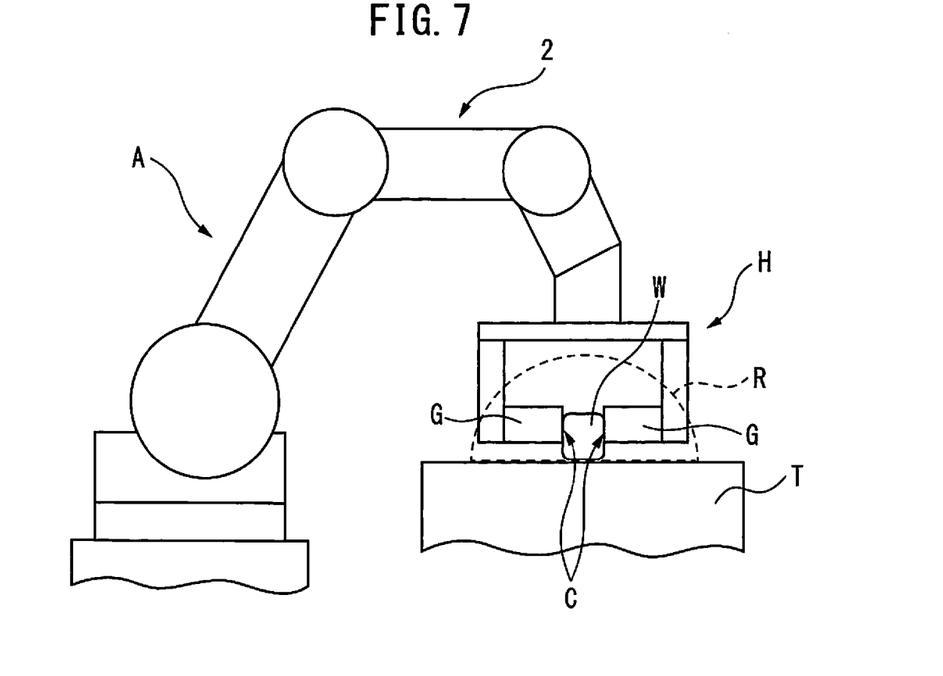
FIG. 7 is a side view which shows the state of the robot and workpiece at the point of time when step S306 in FIG. 3 is completed.
Figure 8:
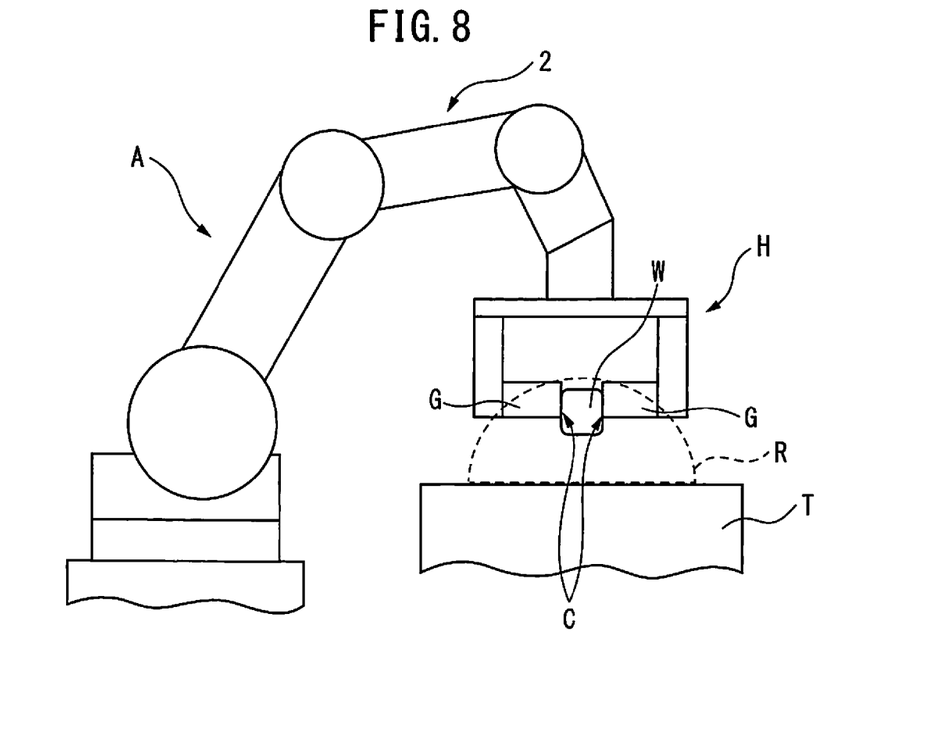
FIG. 8 is a side view which shows the state of the robot and workpiece at the point of time when step S307 in FIG. 3 is completed.

Next, at step S306, the hand H grips the workpiece W with the pair of grippers G, G. FIG. 7 is a side view which shows the state of the robot 2 and workpiece W at the point of time when step S306 is completed. The point of time when step S306 is completed corresponds to the time $t_4$ in the graph of FIG. 4. As explained above, the load of the workpiece W is not transmitted to the robot 2 at this point of time. Next, at step S307, the robot 2 lifts up the workpiece W in the vertical direction. FIG. 8 is a side view which shows the robot 2 and workpiece W at the point of time when step S307 is completed. As will be understood from FIG. 8, at the point of time when step S307 is completed, the workpiece W leaves the top surface of the table T, and therefore the entire load of the workpiece W is transmitted through the hand H to the robot 2. The point of time when step S307 is completed corresponds to the time $t_5$ of the graph of FIG. 4.

Figure 9:
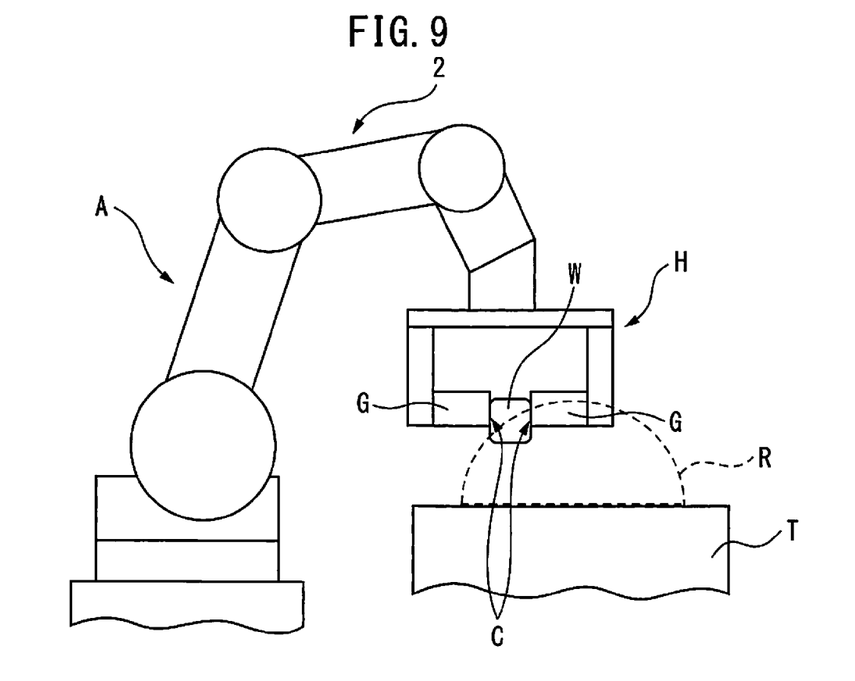
FIG. 9 is a side view which shows the state of the robot and workpiece at the point of time when step S309 in FIG. 3 is completed.
Figure 10:
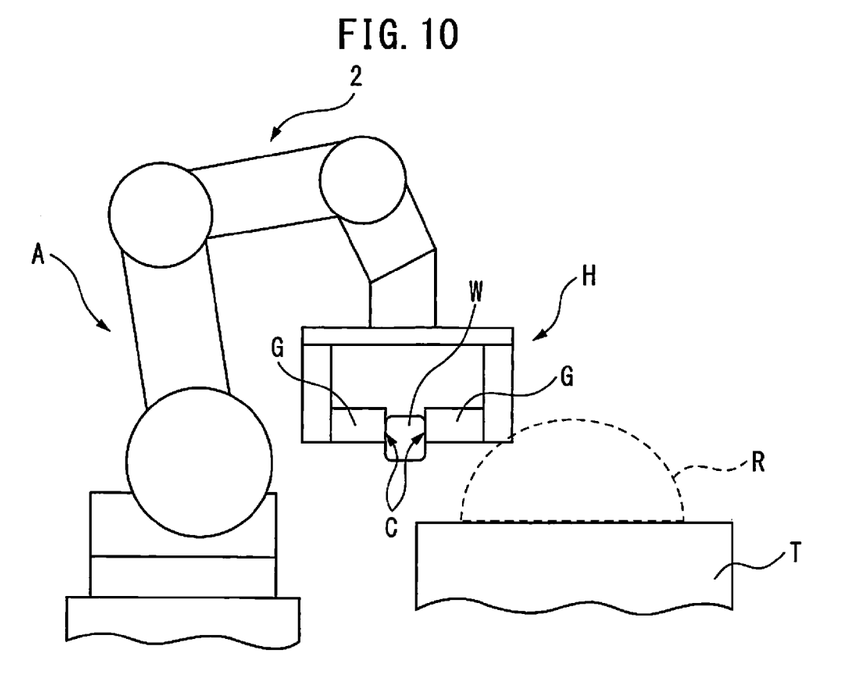
FIG. 10 is a side view which shows the state of the robot and workpiece in the middle of execution of step S310 in FIG. 3.

Next, at step S308, the position judging part 15 of the robot control device 1 judges if the contact parts C, C of the grippers G, C of the hand H have passed across the boundary of the threshold value switching region R. Further, when one or both of the contact parts C, C of the grippers G, G passed across at least partially the boundary of the threshold value switching region R (step S308, YES), the later explained step S309 is executed. On the other hand, when neither contact parts C, C of the grippers G, G passed across the boundary of the threshold value switching region R (step S308, NO), the same judgment is repeatedly performed. Next, at step S309, the collision judging part 16 of the robot control device 1 switches the first threshold value $v_1$ which has been used for the collision judgment until then to the second threshold value $v_2$. FIG. 9 is a side view which shows the robot 2 and workpiece W at the point of time when step S309 is completed. The point of time when step S309 is completed corresponds to the time $t_6$ of the graph of FIG. 4. Next, at step S310, the robot 2 conveys the workpiece W to the above-mentioned second position. FIG. 10 is a side view which shows the robot 2 and workpiece W in the middle of execution of step S310. The point of time which is shown in FIG. 10 corresponds to the time $t_7$ of the graph of FIG. 4.

As explained above, according to a robot control device 1 of the present embodiment, the threshold value for collision judgment is switched in accordance with whether the contact parts C, C of the two grippers G, G of the hand H are located inside the threshold value switching region R. Therefore, it is possible to prevent misjudgment as to whether the robot 2 has collided with an obstacle, even during the period where a state transition is underway from the state where the load of the workpiece W is not transmitted to the robot 2 (see FIG. 7) to the state where the entire load of the workpiece W is transmitted through the hand H to the robot 2 (see FIG. 8). That is, according to the robot control device 1 of the present embodiment, it is possible to prevent misjudgment as to whether the robot 2 has collided with an obstacle even during the period when the above state transition is underway. Note that, in the example which is illustrated in FIG. 5 to FIG. 10 etc., the robot 2 is operated to lift up the workpiece W which is placed on the table T. However, the robot control device 1 of the present embodiment may also judge if there is collision of the robot 2 by means of a similar routine even if the robot 2 is operated to place a workpiece W which is gripped by the hand H on a table T.

Figure 11:
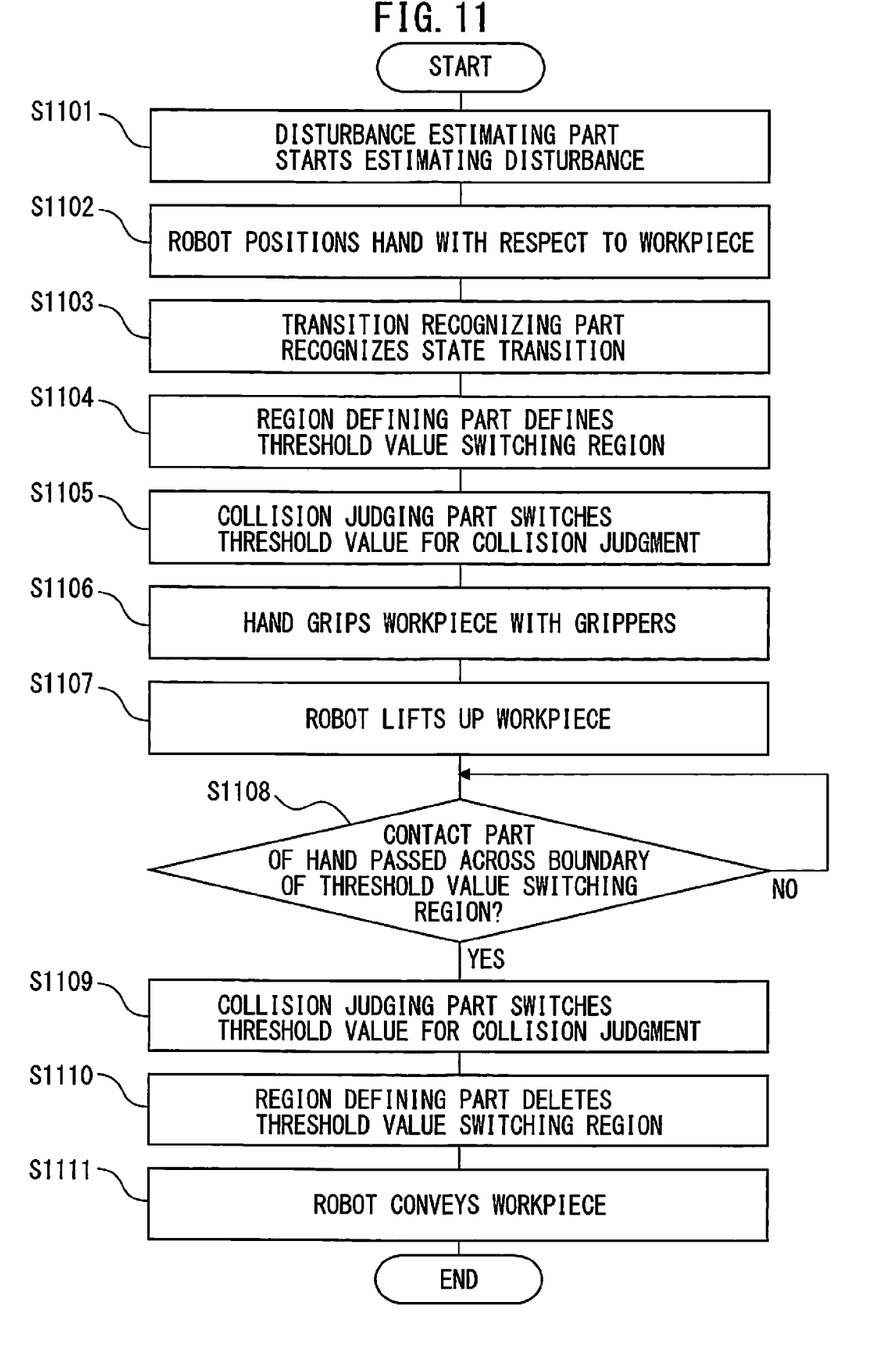
FIG. 11 is a flow chart which shows a routine of another workpiece conveyance process according to a robot system of FIG. 1.

Next, a modification of a workpiece conveyance process according to the robot system S of FIG. 1 will be explained. FIG. 11 is a flow chart which shows a routine of another workpiece conveyance process according to the robot system S of FIG. 1. As will be understood from a comparison of FIG. 3 and FIG. 11, the routine from step S1101 to step S1109 in FIG. 11 is similar to the routine from step S301 to step S309 in FIG. 3. Further, the states of the robot 2 and workpiece W at the points of time when steps S1102, S1104, S1106, S1107, and S1109 in FIG. 11 are completed are similar to the states which are shown in FIG. 5, FIG. 6, FIG. 7, FIG. 8, and FIG. 9. Furthermore, the points of time when steps S1102, S1104, S1105, S1106, S1107, and S1109 in FIG. 11 are completed correspond to the times $t_1$, $t_2$, $t_3$, $t_4$, $t_5$, and $t_6$ in the graph of FIG. 4. For this reason, the routine from steps S1110 to S1111 in FIG. 11 will only be explained below.

Figure 12:
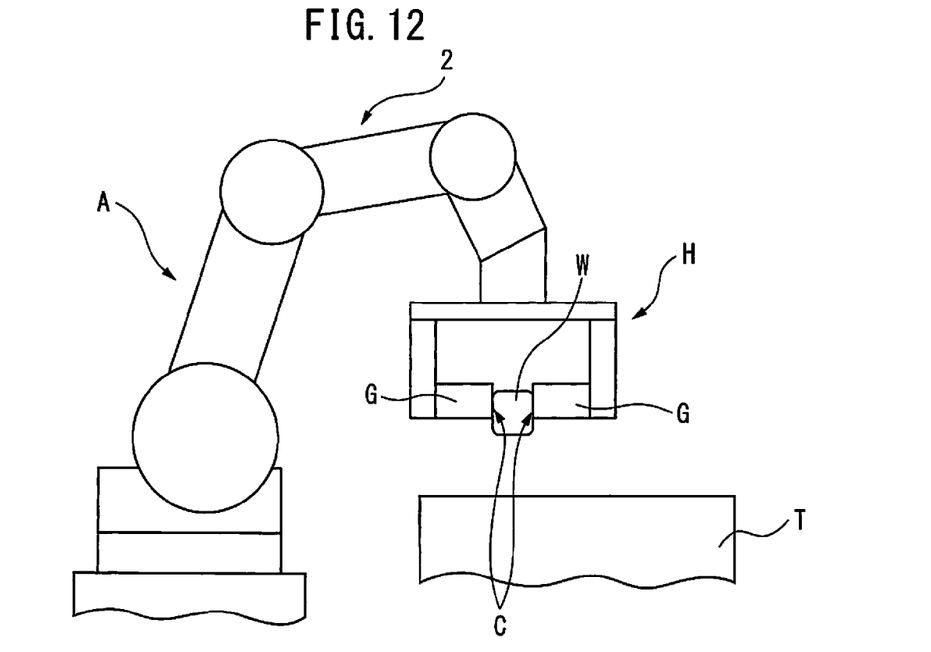
FIG. 12 is a side view which shows the state of the robot and workpiece at the point of time when step S1110 in FIG. 11 is completed.
Figure 13:
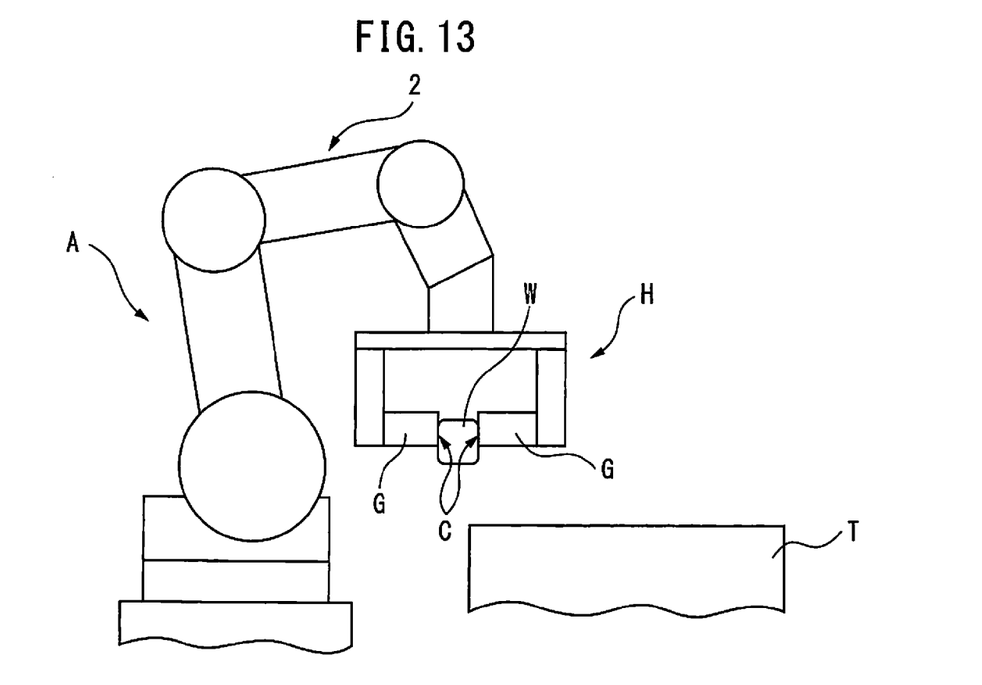
FIG. 13 is a side view which shows the state of the robot and workpiece at the point of time when step S1111 in FIG. 11 is completed.

As shown in FIG. 11, at step S1110, the region defining part 14 of the robot control device 1 deletes the threshold value switching region R which was already defined at step S1104 from the work space. FIG. 12 is a side view which shows the robot 2 and workpiece W at the point of time when the step S1110 is completed. Next, at step S1111, the robot 2 conveys the workpiece W up to the above-mentioned second position. FIG. 13 is a side view which shows the robot 2 and workpiece W in the middle of execution of step S1111. In this way, in the present example, if one or both of the contact parts C, C of the grippers G, G passes at least partially across the boundary of the threshold value switching region R (step S1108, YES), the first threshold value $v_1$ which has been used for collision judgment until then is switched to the second threshold value $v_2$ (see step S1109) and the threshold value switching region R which was already defined at step S1104 is deleted (see step S1110). Therefore, once step S1110 is executed, the collision judging part 16 of the robot control device 1 uses the second threshold value $v_2$ for collision judgment regardless of the results of judgment of the position judging part 15. This ensures that even if one or both of the contact parts C, C of the grippers G, G move to the outside of the threshold value switching region R then again move to the inside of the threshold value switching region R, it is possible to accurately judge whether the robot 2 has collided with an obstacle throughout the entire period of the workpiece conveyance process.

Figure 14:
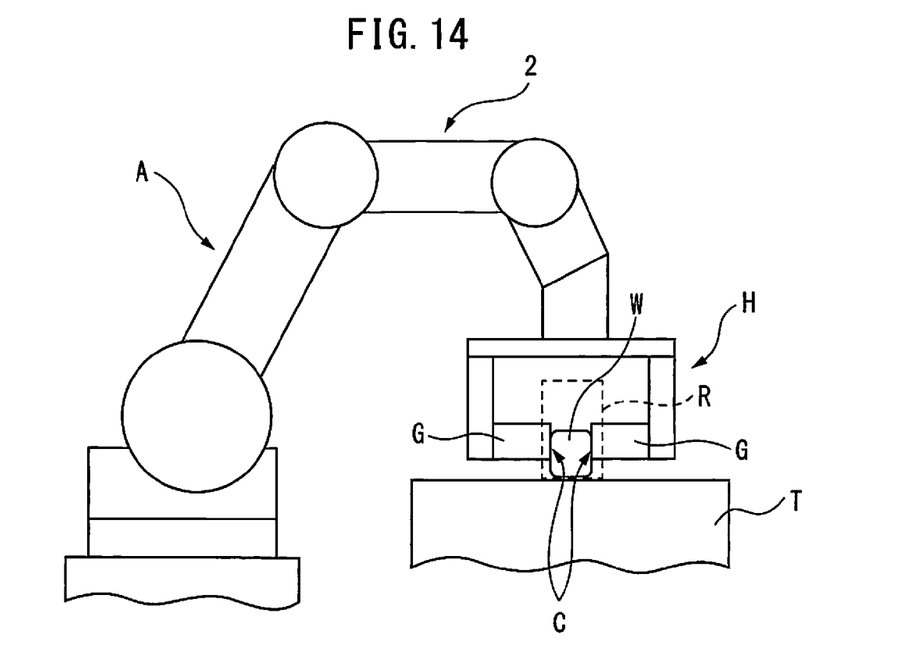
FIG. 14 is a first side view which shows a modification of a threshold value switching region together with a robot and workpiece.
Figure 15:
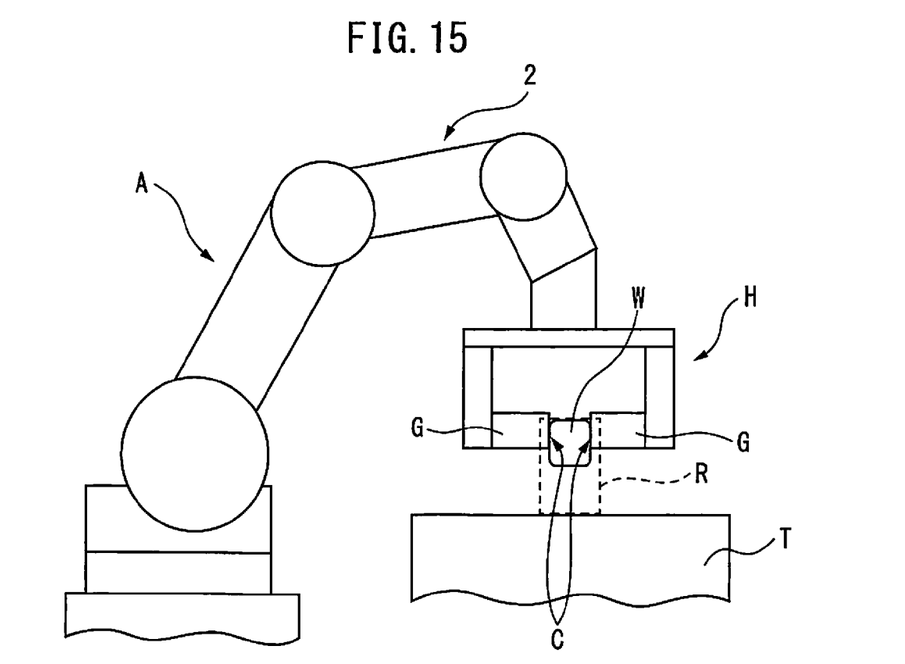
FIG. 15 is a second side view which shows a modification of a threshold value switching region together with a robot and workpiece.

Next, a modification of the threshold value switching region R which is defined at the above step S304 and step S1104 will be explained. FIG. 14 and FIG. 15 are side views which show a modification of the threshold value switching region R together with the robot 2 and workpiece W. FIG. 14, in the same way as FIG. 7, shows the robot 2 and workpiece W at the time $t_4$ in the graph of FIG. 4, while FIG. 15, in the same way as FIG. 8, shows the robot 2 and workpiece W at the time $t_5$ in the graph of FIG. 8. As shown in FIG. 14, the threshold value switching region R of the present example has a columnar form which is virtually arranged on the table T so as to encompass the space which the workpiece W occupies on the table T. The shape of such a threshold value switching region R is determined considering the direction in which the hand H moves after gripping the workpiece W. More specifically, in the present example, the thus defined threshold value switching region R has a columnar form which extends upward from the top surface of the table T in the vertical direction considering the fact that the hand H moves upward in the vertical direction after gripping a workpiece on the table T (see FIG. 15).

If the shape of the threshold value switching region R is determined, it is possible to reduce the dimensions of the threshold value switching region R and thus make them closer to the dimensions of the workpiece W, and therefore it is possible not only to prevent misjudgment by the collision judging part 16 during the period when the above state transition is underway, but also improve the precision of judgment by the collision judging part before and after the above state transition takes place. Note that, the shape of the threshold value switching region R may be automatically determined by the region defining part 14, or may be designated by the user through various user interfaces. In the former case, the region defining part 14 can analyze the operating program PG to specify the movement path of the hand H.

Effect of Invention

According to the first aspect of the present invention, the threshold value for collision judgment is switched in accordance with whether the robot and hand are located inside the region which is defined by the region defining part. Therefore, according to the first aspect, even while a state transition is underway from either one to the other of the state where the load of the workpiece is not transmitted to the robot and the state where the entire load of the workpiece is transmitted through the hand to the robot, it is possible to prevent misjudgment of whether the robot has collided with an obstacle.

According to the second aspect of the present invention, there is no longer a need to provide the robot with a dedicated detector to acquire information for estimate calculation of the disturbance, and therefore it is possible to simplify the configuration of the robot system which includes the robot control device.

According to the third aspect of the present invention, the robot control device no longer needs to acquire information relating to the mass of the workpiece from the outside, and therefore it is possible to simplify the configuration of the robot system which includes the robot control device.

According to the fourth aspect of the present invention, it is possible to accurately judge if the robot has collided with an obstacle throughout the entire period of the workpiece conveyance process even when the robot and hand move to the outside of the region defined by the region defining part and then move back to the inside of the region.

According to the fifth aspect of the present invention, it is possible to reduce the region defined by the region defining part and make it closer to the state of the robot and hand at the start time of the state transition, and therefore it is possible to prevent misjudgment by the collision judging part even during the period when the state transition is underway, and thus possible to improve the precision of collision judgment of before and after the state transition.

The present invention is not limited to the above-mentioned embodiment and can be modified in various ways within the scope described in the claims. For example, in the above embodiment, a fluid pressure drive type of hand is illustrated, but the robot which is controlled by the robot control device of the present invention may also be provided with a servo drive type of hand which is driven by the servo motor, or may also be provided with a pickup type of hand which uses magnetic force or suction force etc. to pick up a workpiece.

The invention claimed is:

1. A robot system, comprising:
   a robot which is provided with a hand configured to grip a workpiece; and
   a robot control device for controlling the robot, the robot control device comprising:
   a disturbance estimating part which evaluates an estimated value of a disturbance which is applied to the robot,
   a transition recognizing part which recognizes the occurrence of a state transition between a state where a load of the workpiece is not transmitted to the robot and a state where the entire load of the workpiece is transmitted through the hand to the robot,
   a region defining part which defines a region which encompasses the robot and hand at the start time of said state transition which is recognized by said transition recognizing part, in a state space which expresses the state of the robot and hand,
   a position judging part which judges if the robot and hand are located inside said region which is defined by said region defining part,
   a collision judging part which compares said estimated value and a predetermined threshold value to judge if the robot has collided with an obstacle, wherein said collision judging part compares said estimated value and a first threshold value when the robot and hand are positioned inside said region, and compares said estimated value and a second threshold value which is different from said first threshold value when the robot and hand are positioned outside said region, and
   an operating instruction generating part which controls movement of the robot corresponding to a result of judgment of the collision judging part.

2. The robot system according to claim 1, wherein said disturbance estimating part uses at least one of a rotational speed and torque of a servo motor which drives the robot to evaluate said estimated value.

3. The robot system according to claim 1, wherein said disturbance estimating part uses a parameter value which expresses a mass of a workpiece which is acquired from an operating program of the robot to evaluate said estimated value.

4. The robot system according to claim 1, wherein said collision judging part compares said estimated value and said second threshold value regardless of the judgment result of said position judging part once the robot and hand have moved from the inside to the outside of said region.

5. The robot system according to claim 1, wherein said the shape of the region is determined considering the direction in which the hand moves after gripping the workpiece.

* * * * *